July 26, 1966     T. W. BRIEGEL ETAL     3,262,188
METHOD OF MAKING ELECTRICAL CONDUIT CONNECTOR
Filed Dec. 10, 1962
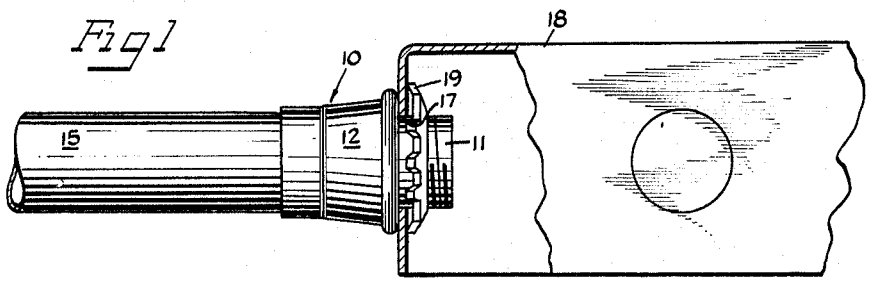
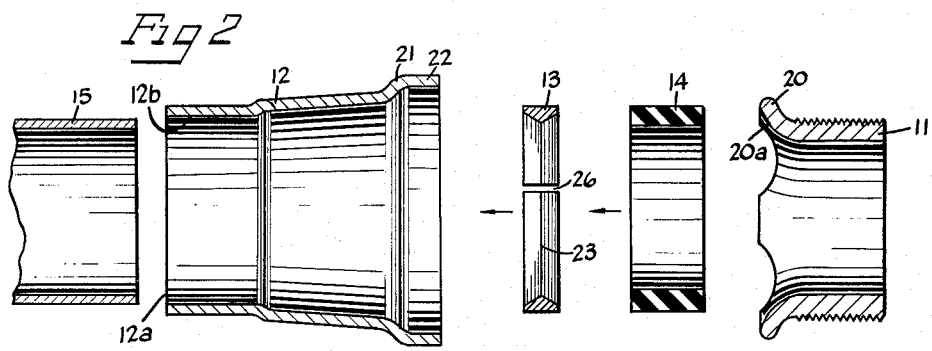
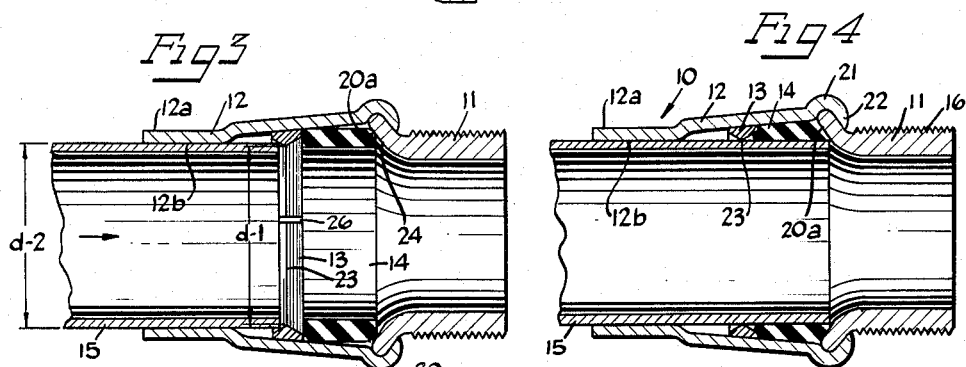
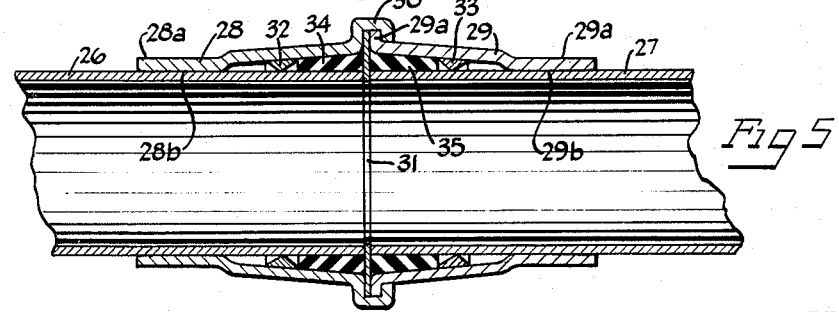
INVENTORS
Theodore W. Briegel
Clifford P. Nelson
BY
ATTORNEYS

United States Patent Office 3,262,188
Patented July 26, 1966

3,262,188
METHOD OF MAKING ELECTRICAL CONDUIT CONNECTOR
Theodore W. Briegel and Clifford P. Nelson, Galva, Ill.; said Briegel assignor to Roach-Appleton Manufacturing Company, South Bend, Ind., a corporation of Delaware
Filed Dec. 10, 1962, Ser. No. 243,370
4 Claims. (Cl. 29—157)

The present invention relates to improvements in the method of making electrical connectors for rigidly joining electrical conduits to electrical outlet boxes or for joining ends of conduits to each other, and particularly to an improved method of making such connectors. This application is a continuation-in-part of application Serial No. 111,965, now Patent Number 3,150,886.

The present invention provides the method of making a simple but rugged and weatherproof connector for use in electrical wiring employing metal conduits and boxes, by providing an easily used slip on construction. The connector includes a tubular insert portion which is threaded on its outer surface and a tapered sleeve portion which receives the conduit end. Within the sleeve portion is a transversely split contractible resilient ring which grips onto the outer surface of the conduit end and is held in gripping engagement by a resilient annular means positioned within the sleeve and preferably in the form of a compressible rubber tube which provides a moistureproof and weatherproof seal.

The unit in accordance with the method of the invention is made in two pieces with the threaded tubular insert formed in one piece with a flared inner end and with the tapered sleeve formed in another piece having an annular flange overlying the flared end of the insert. In the method of making, the split ring is first inserted into the tapered sleeve followed by the resilient annular means and the pieces are then brought together, and the annular flange is turned inwardly over the flared end of the insert.

An object of the present invention is to provide an improved method of making an electrical connector which permits more rapid simplified manufacture and assembly of the connector than methods heretofore available.

Another object of the invention is to provide an improved method of manufacture of the connector which permits the use of improved parts having functional advantages over structures heretofore available and especially which permits the use of an improved split ring with a larger gripping length and permits the use of a rubber tube for a resilient means so as to perform the dual functions of providing a seal and coacting with the ring to urge it toward locking engagement with a conduit.

Other objects, advantages and features of the invention will become more apparent with the teaching of the principles of the invention in connection with the disclosure of the preferred embodiments of the invention, in the specification, claims and drawings, in which:

FIGURE 1 is an elevational view shown with parts broken away illustrating an assembled connector in use;

FIGURE 2 is an exploded sectional view showing the parts in position for assembly;

FIGURE 3 is a sectional view showing the parts after assembly and with the electrical conduit being inserted;

FIGURE 4 is another view of FIGURE 3 showing the position of the conduit after insertion; and FIGURE 5 is a sectional view showing the principles of the invention as embodied in a connector for two conduits.

On the drawings:

In FIGURES 1 and 4 an assembled electrical connector 10 is shown constructed in accordance with the present invention which includes a threaded insert 11, a tapered sleeve 12, a locking ring 13, and resilient means 14 in the form of an expansible rubber tube within the sleeve 12, and a conduit 15 inserted within the sleeve against the insert 11, as will be further described.

The insert 11 is externally threaded with straight pipe thread 16 and thus may be inserted through an opening 17 in an electrical outlet box 18 to be retained in position by a locking nut 19 as will be appreciated by those skilled in the art.

In accordance with the principles of the invention the connector is formed in two separate pieces so that the threaded insert 11 forms a first piece and the tapered sleeve 12 forms a second piece, and in assembled relationship the insert 11 forms a first portion at one end of the connector and the tapered sleeve 12 forms a second portion at the other end of the connector.

The inner end (the end facing axially inwardly toward the tapered sleeve) of the insert 11 is flared radially outwardly at 20 and may be provided with a scalloped configuration. The sleeve 12 tapers inwardly toward its outer end away from the insert 11 at a predetermined acute angle which is preferably 4°. The inner wider end of the sleeve 12 is formed with an outwardly turned annular shoulder 21 and an integral marginal flange 22 (which extends axially in the unassembled parts as shown in FIGURE 2 and which is rolled inwardly as shown in FIGURES 3 and 4). While the sleeve 12 may be tapered uniformly to the outer end, in a preferred arrangement the outer end portion 12a is cylindrical with the tapered portion brought radially inwardly in the forming process to form a cylindrical inwardly facing surface 12b. The cylindrical portion 12a provides an elongated surface for aligning and holding the conduit which will be inserted into the sleeve, and the shoulder at the end of the surface 12b will form a stop for the locking ring B.

The locking ring 13 is a relatively thin metal member having an external surface which may extend axially or may be tapered corresponding to the inner taper of the sleeve 12. The locking ring has a radially inwardly projecting ridge or tooth 23 for biting into the outer surface of the conduit 15 when it is in locked position as shown in FIGURE 4. The tooth is formed by surfaces extending away from the ridge of the tooth 23 at an angle of preferably 30° with the axis of the ring.

The ring 13 is split transversely to form a gap 26 and the overall circumferential length of the ring in a compressed position is greater than the small diameter end 12a of the sleeve 12. The gap 26 however is sufficiently large to permit free contraction of the locking ring against the conduit 15 when it is in locked position as shown in FIGURE 4. It is a feature of the present invention however to make the locking ring 13 of maximum diameter which gives a maximum length for the locking tooth 23. This is made possible by forming the connector in two pieces so that the ring 13 can be assembled by being placed into the open end of the sleeve 12 during assembly, as illustrated by the arrowed lines in FIGURE 2. To require assembly the locking ring 13 through the end 12a of the sleeve would require a larger gap 26 thus reducing the length of the surface of the tooth 23, and this is avoided with the present method of construction.

The resilient member 14 is preferably in the form of a resilient bushing or tube formed of an elastomeric displaceable, preferably non-compressible material such as rubber or neoprene. While in certain embodiments other resilient members may be employed such as coil compression springs, the present structure is preferred, and the tube 14 serves a dual purpose in aiding the locking ring 13 during assembly, and in sealing the conduit to the connector after assembly.

The bushing 14 has an inner diameter which just accommodates the conduit 15, as shown in FIGURES 3 and 4. In the normal unstressed position of the parts, as illustrated in FIGURE 3, the resilient member 14 is not axially or radially stressed. The locking ring 13 is positioned just at the end of the resilient member 14 and the resilient member extends against the shoulder 20a formed by the flared end 20 of the insert 11. The dimensions of the resilient member 14 and the locking ring 13 are such that the inner diameter of the tooth 23 of the locking ring is less than the outer diameter of the conduit 15. In other words, as shown in FIGURE 3, $d$–1 (the inner diameter of the locking ring 13) is smaller than $d$–2 (the outer diameter of the conduit 15).

When the conduit is shoved toward locking position (which is to the right to move it from FIGURES 3 and 4), the locking ring must first slide to the right toward the larger end of the sleeve 12. This compresses the resilient member 14 so that it fills up the small spaces outside of the conduit 15 within the sleeve 12 forming a seal in the position shown in FIGURE 4. When the conduit pushes against the shoulder 20a of the insert and is released, the resilient member will tend to push the locking ring to the left to cause its tooth 23 to bite into the outer surface of the conduit 15. Any attempt to withdraw the conduit will cause the tooth 23 to bite more deeply into the conduit, and it has been found that this structure far exceeds minimum requirements and exceeds expectations for a connetcor of relatively simple construction.

As will be observed from the relationship of the elements, any force tending to pull the conduit to the left will cause the locking ring to slide along the tapered inner surface of the sleeve 12 and cause the tooth 23 to dig into the conduit with an increasing force to displace the metal and form a rigid almost integral lock.

Thus in accordance with the method of assembly, the insert 11 and the bushing 12 are placed in the positions shown in FIGURE 2, and the locking ring 13 is inserted to the left into the large open end of the sleeve 12. This is followed by the resilient member 14. When these are in place, the flared end 20 of the insert is placed within the flange 22, which is then rolled inwardly over the flared edge 20 to form the assembly shown in FIGURE 3. While a completely rigid lock is formed since the flange 22 in effect forms an annular recess or pocket for the flared end 20, the resiliency of the resilient member 14 further urges the flared end 20 into more rigid seated position within the inwardly rolled flange 22. Also, the joint between the two members is filled by the resilient member 14 in the compressed condition as occurs when the conduit 15 is inserted, as shown in FIGURE 4.

The assembled connector (as shown in FIGURE 3) without the conduit 15, is ready for use and to assemble it is installed on a conduit by sliding the conduit 15 into the end as shown by the arrowed line in FIGURE 3. As previously described, the conduit end enters the locking ring compressing the resilient member 14 in an axial direction, and since a resilient member 14 of a non-compressible material is preferably used and displacement of the member will occur in a radial direction fitting the voids between the conduit and the sleeve 12. The finished assembly provides a rigid non-yieldable joint, and the joint is sealed against the entry of water or dust so that the unit is well suited to use in explosionproof installations where dust must not enter, or in external installations which must be weatherproof and be sealed against water. An adequate seal will of course have to be used between the connector and the box 18.

FIGURE 5 illustrates the principles of the invention as applied to a connector for adjacent conduits 26 and 27. First and second sleeves 28 and 29 are provided, with the sleeve 29 having a radially outwardly extending flared portion 29a, and the sleeve 28 having a flange 30. The flange 30 is rolled inwardly over the flared portion 29a in the assembled position of the unit. Between the sleeves 28 and 29 is inserted a washer 31 having an outer diameter to fit between the sleeves and be held rigidly therein and having an inner diameter sufficiently small to be engaged by the conduits 26 and 27. The washer 31 fixes the limit of the conduits for accurate compression of the resilient members 34 and 35 which are positioned between the washer 31 and locking rings 32 and 33.

Thus in the assembled coupling or connector of FIGURE 5, the ends of the conduits 26 and 27 are forced axially into the coupling against the washer 31. The relationship between the locking rings 32 and 33 and the resilient members 34 and 35 is the same for the connector of FIGURES 1 through 4. That is, the locking rings 32 and 33 in the normal position of the coupling without conduits inserted therein, are positioned just at the ends of unstressed resilient members 34 and 35. Also, the inner points or teeth of the locking rings 32 and 33 have a diameter (in the normal unstressed position) smaller than the outer diameter of the conduits 26 and 27.

Therefore, when the conduits are inserted the locking rings are pushed axially inwardly toward the center of the coupling to compress the resilient members 34 and 35 and form a seal. The compressed resilient members urge the locking rings 32 and 33 outwardly so that their teeth bite into the outer surface of the conduits 26 and 27.

By making the coupling of FIGURE 5 in separate pieces, the axial location of the washer 31 can be accurately positioned so that the resilient members 34 and 35 will compress a proper amount for forming a seal. This will also enable more easy assembly with each conduit being separately inserted into the coupling. Further, the locking rings 32 and 33 can be made of maximum length for improved length of the biting tooth of the locking rings and improved strength.

The sleeves 28 and 29 are brought radially inwardly at their ends to form cylindrical end portions 28a and 29a which provide cylindrical inwardly facing surfaces 28b and 29b. The structure and function of these cylindrical portions and shoulders are similar to that described above in connection with the arrangement of FIGURES 3 and 4.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

We claim as our invention:

1. The method of making an electrical connector having a threaded tubular portion at one end for insertion into an electrical box opening and a tapered sleeve portion at the other end with a split compressible locking ring and an axially expansible resilient member therein comprising, forming the threaded portion as a separate tubular shaped piece, sequentially inserting the ring and the resilient member into the larger diameter inner end of the tapered portion, and rigidly joining the inner ends of the tubular portion and tapered portion thereby holding the ring and resilient member within the tapered portion.

2. The method of making an electrical connector having a threaded tubular portion at one end for insertion into an electrical box opening and a tapered sleeve portion at the other end with a split compressible locking ring and an axially expansible resilient member therein comprising, forming the threaded portion as a separate tubular shaped piece with an outwardly flared inner end, inserting the ring and resilient member sequentially into the larger diameter inner end of the tapered portion, and forcing an annular flange on the inner end of the tapered portion inwardly to overlie the flared end of the tubular portion for rigidly joining said portions.

3. The method of making an electrical connector having a threaded tubular portion at one end for insertion into an electrical box opening and a tapered sleeve portion at the other end with a split compressible locking ring and an axially expansible resilient member therein comprising, forming the threaded portion as a separate tubular shaped piece, forming the ring with a radially compressed diameter smaller than the inner end of said tapered portion and larger than the outer end thereof, inserting the ring and the resilient member into the larger diameter inner end of the tapered portion, and rigidly joining the tubular portion and tapered portion thereby holding the ring and resilient member therein.

4. The method of making an electrical connector having a threaded tubular portion at one end for insertion into an electrical box opening and a tapered sleeve portion at the other end with a split compressible locking ring and an axially expansible elastomeric tube therein comprising, forming the threaded portion as a separate tubular shaped piece, sequentially inserting the ring and the resilient member into the larger diameter inner end of the tapered portion, rigidly joining the inner ends of the tubular portion and tapered portion thereby holding the ring and resilient member within the tapered portion, axially inserting a tubular conduit end into the outer end of said sleeve axially forcing the ring inwardly and compressing said tube, and releasing said conduit so that the ring will be pushed axially outwardly by the tube to lockingly seat against the outer surface of the conduit.

References Cited by the Examiner

UNITED STATES PATENTS

| | | | |
|---|---|---|---|
| 1,383,718 | 7/1921 | Grunwald | 285—161 |
| 1,797,418 | 3/1931 | Hottersall | 29—511 |
| 2,017,994 | 10/1935 | Spang | 285—375 |
| 2,230,725 | 2/1941 | Nathan | 285—340 |
| 2,284,365 | 5/1942 | Briegel | 285—382 X |
| 2,332,893 | 10/1943 | Clickner. | |
| 2,458,276 | 1/1949 | Langley et al. | 285—161 |
| 2,503,094 | 4/1950 | Buchanan | 285—383 |
| 2,535,837 | 12/1950 | Coyle. | |
| 2,648,123 | 8/1953 | Phillips | 29—511 |
| 2,702,202 | 2/1955 | Kaiser | 285—317 |
| 2,848,256 | 8/1958 | Tyler | 285—317 |

FOREIGN PATENTS 605,006   7/1948   Great Britain.

CHARLIE T. MOON, *Primary Examiner.*

CARL W. TOMLIN, *Examiner.*

S. R. MILLER, *Assistant Examiner.*